G. Geer.
Cherry Stoner.
N° 63,716. Patented Apr. 9, 1867.
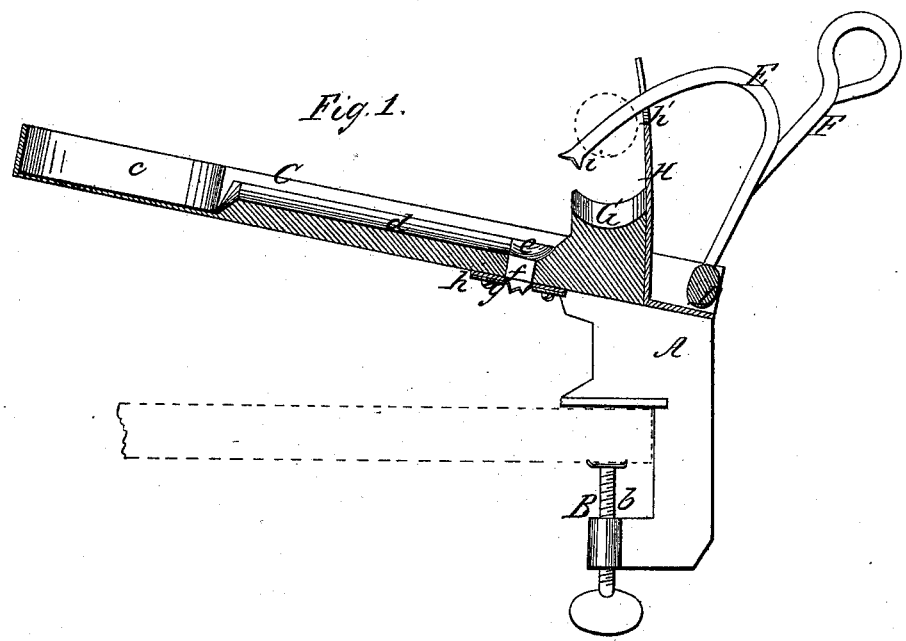
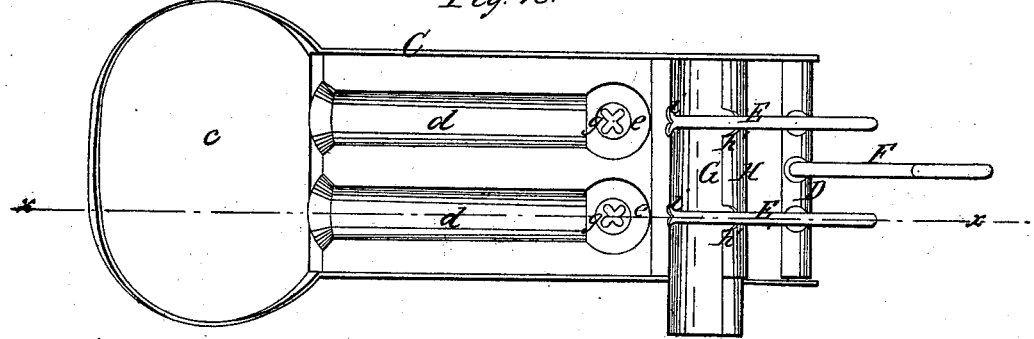
Witnesses:
Theo Tusche
J. A. Service
Inventor
Geo Geer
Per Munn
Attorneys

United States Patent Office.

GEORGE GEER, OF GALESBURG, ILLINOIS, ASSIGNOR TO HIMSELF, T. G. HADLEY, AND WILLIAM HAMILTON, OF THE SAME PLACE.

Letters Patent No. 63,716, dated April 9, 1867.

IMPROVED CHERRY STONER.

*The Schedule referred to in these Letters Patent and making part of the same.*

TO ALL WHOM IT MAY CONCERN:

Be it known that I, GEORGE GEER, of Galesburg, in the county of Knox, and State of Illinois, have invented a new and improved Device for Stoning Cherries; and I do hereby declare that the following is a full, clear, and exact description thereof, which will enable others skilled in the art to make and use the same, reference being had to the accompanying drawings, forming part of this specification, in which—

Figure 1 is a side sectional view of my invention taken in the line $x\ x$, fig. 2.

Figure 2, a plan or top view of the same.

Similar letters of reference indicate like parts.

This invention relates to a new and improved device for stoning cherries, that is to say, taking the pits or stones from the cherries, leaving the pulpy portion entire or intact. The object of the invention is to obtain a device for the purpose specified which will admit of the work being done much more rapidly than by the ordinary hand process.

A represents a standard, the lower part of which is provided with a lateral recess, $b$, and a set-screw, B. The recess and screw forming a clamp by which the device may be secured to the edge of a table or to any suitable fixture. This will be fully understood by referring to fig. 1. C represents a box or trough, slightly inclined from a horizontal plane, and having its lower or depressed end secured to the upper end of the standard A. The elevated end of the box or trough C is made of circular form, as shown at $c$, to serve as a receptacle to hold a requisite quantity of cherries, and the portion of the box or trough below $c$ is narrower and is more elevated than the bottom of $c$, having two longitudinal grooves $d\ d$, made in it to conduct the cherries into cavities $e\ e$, where they are operated upon by mechanism hereinafter described, holes $f$ being made entirely through the bottom of the box or trough in line with the cavities $e\ e$, as shown clearly in fig. 1. To the bottom of the box or trough, in line with the holes $f$, there are affixed pieces of leather, $g$, slitted in the form of a cross, as shown clearly in fig. 2. A single piece of leather may be used, with two cross slits made in it, one underneath each hole $f$, and the leather may be secured in position by a plate, $h$, screwed to the bottom of C, as shown in fig. 1. In the lower or depressed end of the box or trough C there is fitted transversely a rock-shaft, D, which has two curved arms, E E, attached, the shape of which is clearly shown in fig. 1. The free or disengaged ends of these arms E E are forked so as to have four prongs, $i$; which slightly spread or diverge from each other, and these forked ends are allowed to work or pass through the holes $f$ and the slits in the leather $g$, when the arms E E are operated or moved up and down, the rock-shaft D being placed at such a relative distance from the holes $f\ f$ as to admit of that result. The rock-shaft D is provided with a handle, F, for the convenience of working the arms E E. G is a trough placed transversely on C, in an inclined position a trifle below the recesses $e\ e$ and holes $f$, said trough having its lower end projecting a little over or beyond the side of C. H is an upright plate secured in the box or trough C, and extending up by the side of the trough G, the upper end of said plate having two notches or recesses $h'\ h'$ made in it for the arms E E to work through. This plate H performs two important functions—it serves as a stop to limit the downward movement of the arms E E, and also as a stripper to detach the pitted or stoned cherries from the prongs $i$ of the arms E when the latter are raised or drawn upward.

The operation is as follows: The device, by means of the clamp, is secured to the edge of a table or other suitable fixture, a receptacle being placed underneath the holes $f$ to receive the pits or stones, and a pan placed in the lap of the operator to receive the pitted or stoned cherries from the trough G. The vessel containing the cherries to be operated upon is placed on the table near the elevated end of the box or trough C, so that the hopper $c$ may be readily supplied from time to time, as may be required. The cherries, by virtue of their own gravity, aided occasionally by the fingers of the operator, pass down the grooves $d\ d$ to the recess or cavities $e\ e$. By pressing down the arms E E the pronged ends $i$ pass through the cherries in $e\ e$, forcing the pits or stones out therefrom, which fall into the receptacle prepared to receive them, and in case a pit or stone should occasionally adhere to the prongs it is stripped therefrom by the leather $g$ as the arms are drawn upward. As the arms E E are drawn upward the prongs $i$ carry the stoned cherries with them, and they are stripped from the prongs by the plate H, and drop into the trough G, from whence they are discharged into the pan in the lap of the operator. I do not confine myself to any particular material in constructing the within-described device. It may be composed of sheet metal, malleable cast iron, or of wood and iron combined.

What I claim as new, and desire to secure by Letters Patent, is—

1. The rocking-shaft and the curved forked plungers, with the handle or lever, made and arranged and operating in the manner as and for the purpose herein shown and described.

2. The upright plate for the combined purpose of arresting the downward stroke of the plungers, and stripping the cherries from the forks, made and arranged substantially as shown and described.

GEO. GEER.

Witnesses:
    M. D. COOKE,
    G. A. MARSH.